J. C. WAHL.
CALCULATING MACHINE.
APPLICATION FILED SEPT. 11, 1911.
1,242,282.
Patented Oct. 9, 1917.
2 SHEETS—SHEET 1.
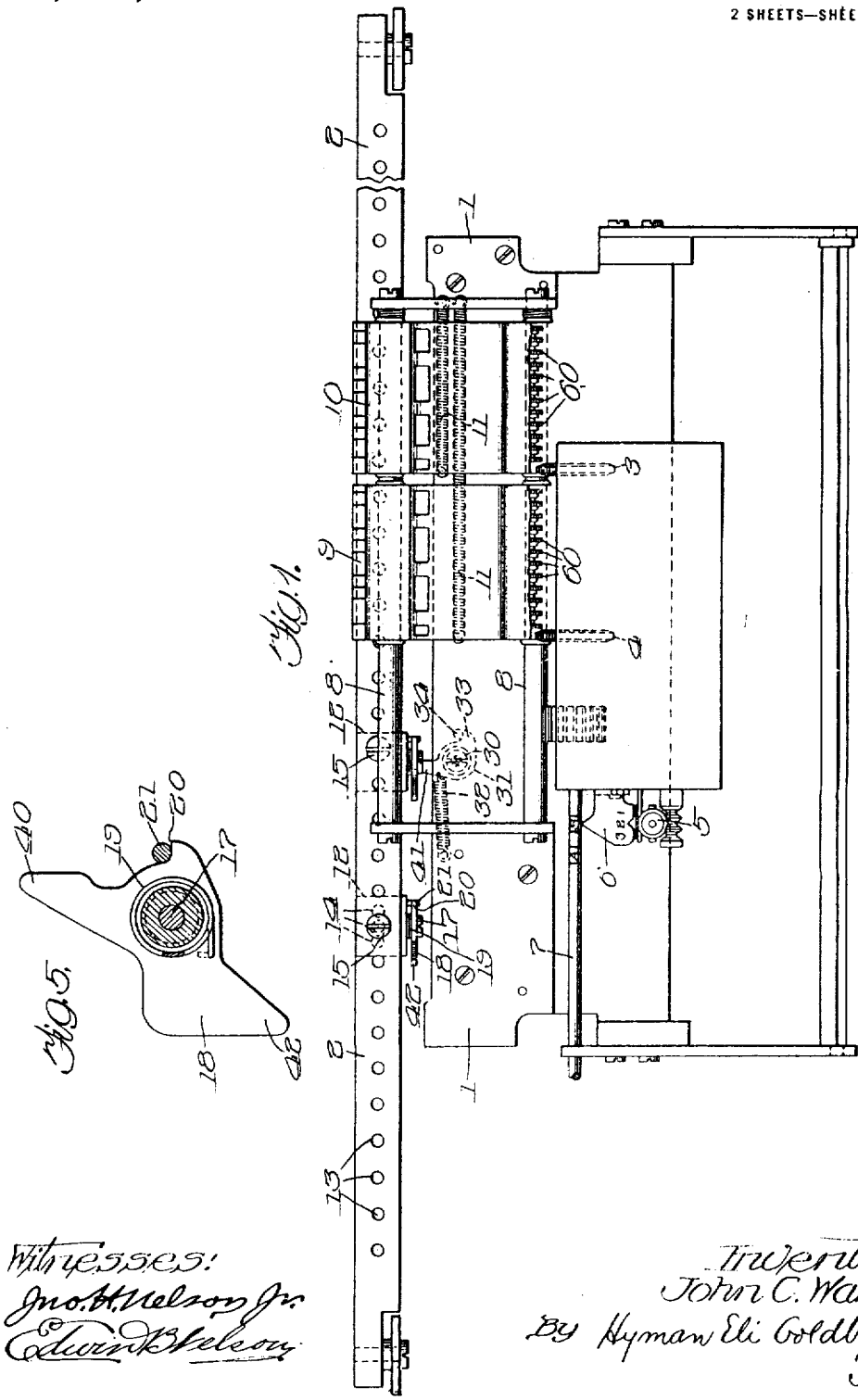
Witnesses:
Jno. H. Nelson Jr.
Edwin B. Nelson
Inventor:
John C. Wahl.
By Hyman Eli Goldberg
Atty.

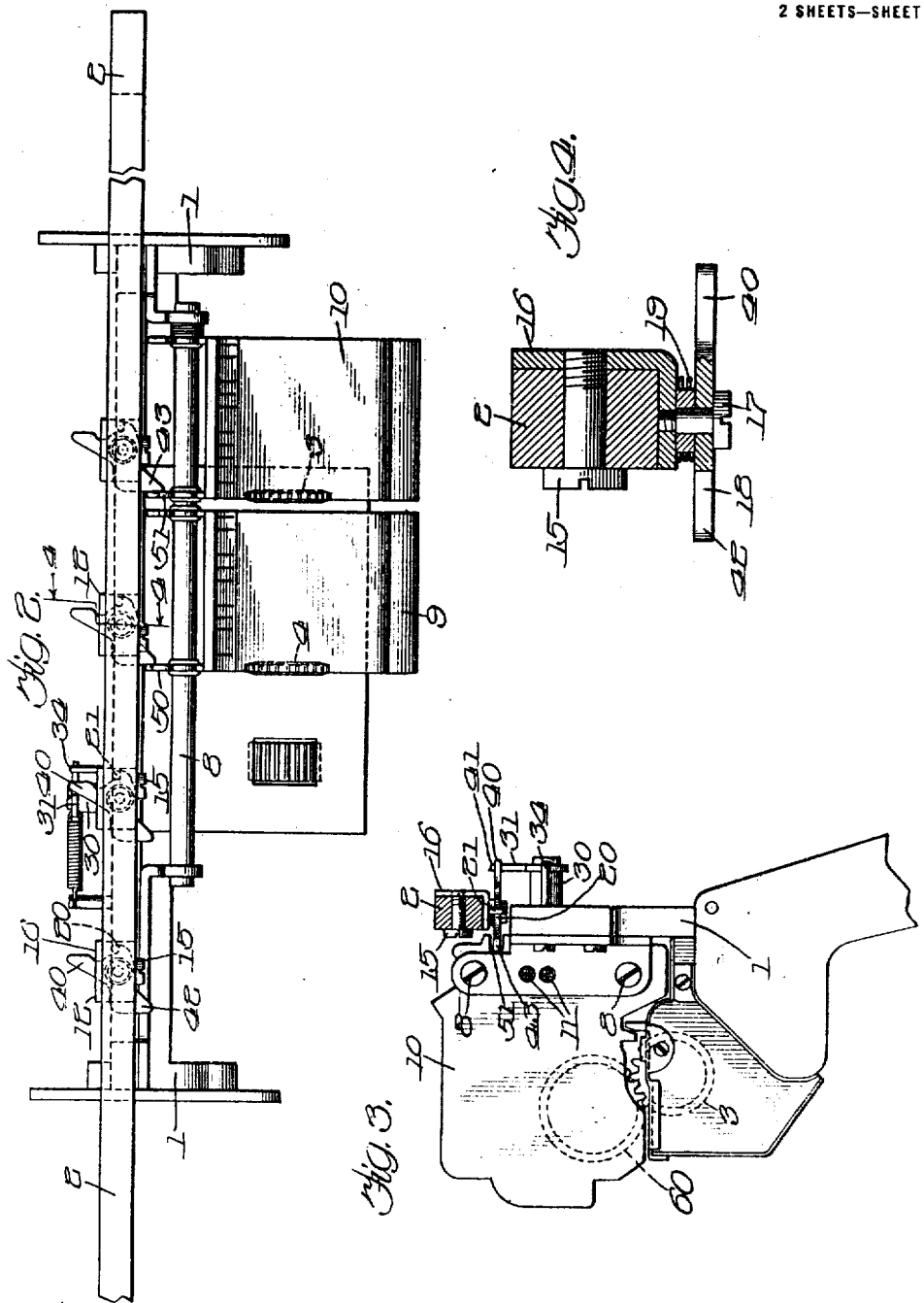

UNITED STATES PATENT OFFICE.

JOHN C. WAHL, OF CHICAGO, ILLINOIS, ASSIGNOR, BY MESNE ASSIGNMENTS, TO WAHL ADDING MACHINE COMPANY, OF WILMINGTON, DELAWARE, A CORPORATION OF DELAWARE.

CALCULATING-MACHINE.

1,242,282.  Specification of Letters Patent.  Patented Oct. 9, 1917.

Application filed September 11, 1911. Serial No. 648,696.

*To all whom it may concern:*

Be it known that I, JOHN C. WAHL, a citizen of the United States, residing at Chicago, in the county of Cook and State of Illinois, have invented certain new and useful Improvements in Calculating-Machines, of which the following is a specification.

My invention deals with a mechanism for printing a series of numbers in a line, for obtaining the total of each series of numbers so printed, and for obtaining a grand total of the totals thus derived. The mechanism is somewhat similar in principle and in construction to the one shown in Patent No. 893,717, issued to me July 21st, 1908.

This specification is accompanied by drawings of which—

Figure 1 represents a front elevation of a calculating machine such as the one shown in the above cited patent.

Fig. 2 is a plan view of a part of the calculating machine.

Fig. 3 is an end elevation of the same taken from the right side.

Fig. 4 is an enlarged view of the upper right portion of Fig. 3, and

Fig. 5 is an enlarged view of the engager plate and the accompanying mechanism.

Like the calculator in the above cited patent, the present one is supposed to be attached to a typewriter. The typewriter framework, as well as the framework of the calculator is represented by 1. Mounted upon the typewriter to travel thereon is the carriage which operates in the ordinary way and to which is fastened the bar 2, which therefore travels along during the letter space advance of the carriage. Of course there are supposed to be present keys, type bars, escapement, tabulator, and all the other mechanism associated with a typewriter calculator, but as they form no part of my invention, and any detailed reference to them would tend to confuse rather than to clarify, they will not be further explained.

Connected to and operated by the keys of the typewriter is the master wheel 3 at the right and the master wheel 4 at the left. These are connected by intermediate mechanism to a handle 5 which may be manually placed into any of three positions, denoted by the figures 1, 2, and 3, marked upon the indicator 6 (Fig. 1). When the handle is in position 1, the two master wheels 3 and 4 rotate in the same direction. When in position 2, master wheel 3 rotates while master wheel 4 does not rotate. When in position 3, both master wheels rotate, but in opposite directions. There is also present a reversing shaft 7 which may be manually placed in either of two positions. The displacement of the reversing shaft 7 into its other position causes the reversal of the direction of rotation of both master wheels 3 and 4. By means of the reversing shaft, and the handle, as well as other mechanism, the master wheels 3 and 4 may thus be given quite a variety of rotations both relatively to each other and relatively to the framework.

Slidably mounted upon the bars 8—8 fastened to the framework are two totalizers, the sub-totalizer 9 and the grand totalizer 10. These totalizers differ in no manner from each other and the names are given to them simply to distinguish them one from the other in the further explanation of the mechanism. To each is fastened one end of a tension spring 11, whose other end is fastened to the framework. Each totalizer is thus given a tendency to return to the right if displaced therefrom. The totalizers are shown in their normal positions in Fig. 1.

Mounted upon the carriage bar 2 are a series of engagers 12. The bar 2 has drilled therein a series of holes 13 which are three letter steps of the typewriter apart and each engager 12 is furnished with three holes 14 therein. Each engager is fastened to the framework by means of a stud 15 which passes through one of the bar holes 13 and enters into the engager holes 14. It is evident that by means of this arrangement the engagers may be given any desired adjustment upon the carriage bar.

Each engager is composed of an angle plate 16 on which is mounted a screw 17 and upon which rotates the engager plate 18. A helical spring 19 with one end fastened to the engager plate 18 and its other end fastened to the angle plate 16 gives to the engager plate 18 a tendency to remain in a normal position and to return thereto, if displaced therefrom. This normal position is determined by the contact of the edge 20 of the engager plate against the pin 21 fastened into the angle plate 16 (Figs. 2 and 5). Pivotally mounted upon a stud 30 fastened in the framework of the calculator is a disconnector 31. The disconnector has fastened to it one end of a tension spring 32 whose other end is fastened to the framework, and the disconnector is therefore given a tendency to remain in a normal position and to return thereto if displaced therefrom. This normal position is determined by the contact of an edge 33 of the disconnector against the stop 34 which stop in this instance is a pin inserted into the framework. Fig. 1 shows the disconnector in its normal position.

It is evident that whenever the carriage bar 2 travels to the left, then the backs 40 of the engagers come *seriatim* into contact with the top 41 of the disconnector. It can be seen from the location of the disconnector that it cannot yield under the impact of the engagers, so it is the engagers that yeild. They therefore swing about the screws 17 thus drawing their front noses 42 backward. Upon the retraction of the carriage and the carriage bar 2 to the right, it is the engagers that cannot yield and the disconnector that can. Therefore during the retraction of the carriage bar the disconnector turns about its pivot and the engagers pass over it. Upon a close examination of Fig. 2, it will be seen that the front noses 42 of the three engagers at the left are shorter than the front nose 43 of the engagers at the right. Moreover, an examination of the same figure will show that the left wall 50 of the totalizer 9 is not as long as the left wall 51 of totalizer 10. The right walls of the totalizers are cut away in order not to interfere with the noses of the engagers.

In operation, the mechanism functions as follows: Assume the carriage bar to be at its extreme right position with its left-most engager to the right of the totalizer 10. Upon the operating of the keys, the carriage bar will advance during the letter space advance of the typewriter. After some time the nose 42 of the left-most engager will come opposite the left wall 51 of the totalizer 10, but as both engager and wall are short, they will pass each other without contact and therefore without any action. The further operating of the typewriter brings the engager opposite the left wall 50 of totalizer 9. Here the engager is short, but the left wall 50 is long enough to make up for it, and therefore contact will be made by the engager and the left wall 50, and the further letter space advance of the bar will cause a corresponding movement in the totalizer 9. An examination of Fig. 1 will show that in the normal position the wheels 60 of the totalizers do not engage the master wheels, but that a small motion to the left will bring these wheels 60 into engagement with the master wheels. This small motion is now imparted to the totalizer 9 by the further motion of the carriage bar. The wheels of the totalizer therefore engage the master wheel. The further continued movement of the carriage bar and the consequent movement of the totalizer results in the bringing of the back edge 40 of the engager against the top 41 of the disconnector and the consequent drawing in of the nose 42, as above explained. The contact between nose 42 and wall 50 is therefore broken. The totalizer 9 under the influence of its spring 11 is immediately retracted to the right. Further movement of the carriage bar results in again picking up and pushing forward totalizer 9 by the second engager, etc. There is therefore computed in totalizer 9 the sum of the numbers thus inserted on the calculator keys. During all this time, the grand totalizer 10 has been stationary. However, when the parts reach the position shown in Fig. 2, that is, when the short nose 42 engages the long wall 50, and similarly the long nose 43 engages the short wall 51, then both totalizers will contact simultaneously with the engagers, and any further movement of the carriage bar to the left carries both totalizers over their master wheels to be operated by them.

Assume that the handle 5, up to this time, has been in position one (1), (that is, wheel 4 rotates in the adding direction) and that the handle be now shifted to position three (3) (so that the wheel 4 now rotates in a subtracting direction and the wheel 3 in an adding direction). Then the operating of the keys would now result in subtracting the total out of totalizer 9, and the simultaneous inserting thereof into totalizer 10. This would complete the operation for one line. During the writing of the next line, there would again be calculated upon the totalizer 9 the sum of the numbers written horizontally, which new total would again be transferred to the totalizer 10. Totalizer 10 would therefore show the sum of the two totals, each of which was previously derived by the totalizer 9. It is thus evident that after any number of lines being written and computed, totalizer 10 will always show the grand total of all the totals previously and individually computed by totalizer 9.

During the printing of the grand total the handle may be shifted to position two (2) and the reversing shaft be set to subtract. Master wheel 3 will therefore operate to subtract the grand total out of the grand totalizer while master wheel 4 will remain stationary and therefore will not affect the sub-totalizer.

As stated above, similar results, namely the computation of totals and grand totals, have been accomplished by other mechanisms, for instance, by the mechanism shown in the above cited Patent, No. 893,717. But the mechanism shown here is quite different from the above in some of its principles, and its parts are more strongly built. For instance, the totalizers are mounted upon short bars instead of long trucks, and can easily be made rigid and thus coöperate with the mating gears much more accurately.

It may be noticed by a comparison of the mechanism shown in this application with the mechanism described in my previously issued Patent No. 893,717, that the reciprocation of the totalizers is accomplished in a different manner. In said patent, the reciprocatory totalizer has a pawl mechanism mounted thereon, which mechanism is contacted by members fastened to the printing carriage. The totalizer is a comparatively complicated piece of mechanism, and in practice it has been found advisable to keep it as simple as possible. I have therefore so constructed the parts that the pawl mechanism is mounted not upon the totalizer but upon the printing carriage and this is one of the objects of my invention.

There has been described above a calculator containing two totalizers, one reciprocating for the total of numbers printed in a horizontal line, and the other traveling for the grand total of the various line totals. It is evident that it need not be the totalizers that travel. The mechanism could be modified without departing from the spirit of my invention. For instance, it might be the master wheels that move and the totalizers that remain stationary. Thus modified there would be a reciprocatory master wheel for the line totals, and a traveling master wheel for the grand totals, and the engagers mounted upon the carriage bar would then be made operative not upon the totalizers, but upon the master wheels.

But even this does not exhaust the possibilities of easy modification, for it is evident that neither totalizers nor master wheels need move. They may be replaced by mechanism in which there is a traveling connector which determines the decimal place of calculation. Such mechanism has been shown in several patents, as for instance, Patent No. 946,366, issued January 11, 1910. In all of these cases, however, there must always be some member which moves to determine the decimal place of calculation, and this member is called the decimal carriage, whether that decimal carriage be a traveling totalizer, a traveling master wheel, or a traveling connector.

As far as I am aware, I am the first one to have constructed a mechanism including therein a decimal carriage reciprocating for the calculation of the totals of numbers printed in a horizontal line, and another decimal carriage which remains stationary during the calculation of the line totals, but moves during the calculation of the grand totals. Viewed from another standpoint, it might be said that this application is the first to show a mechanism including a sub-total decimal carriage and a grand-total decimal carriage; the sub-total reciprocating during the accumulation of the numbers whose sum composes the sub-totals, the grand-total decimal carriage remaining stationary, meanwhile, and both decimal carriages traveling during the accumulation of the grand totals.

While this application has so far described engagers whose engager plates are all in the same plane, and which therefore travel through the same path, it is evident that this need not be so, but that some of the engagers might be mounted at a different height than the others. The left walls will naturally have to be accommodated thereto, and their projections will therefore also come at different heights, all being offset from each other. Under these circumstances, each engager would coöperate only with its own totalizer, and would pass the other totalizer without any hindrance.

The drawings show the bars 8—8 upon which the totalizers reciprocate to be quite short, whereby the extent of reciprocation is quite limited. But there is nothing in this invention which thus limits the construction to short bars. They may be lengthened to any extent to the right or to the left. It is evident therefore that if so desired the grand totalizer might be carried by the carriage bar far enough to the left so that its engager nose 43 will be retracted from the grand totalizer. Thereupon the printing carriage may proceed farther to the left to an unlimited extent for the writing of words and figures.

Having thus described my mechanism, I claim:

1. In a machine adapted for calculating and horizontal printing, the combination of: a sub total decimal carriage for the accumulation of numbers printed in a horizontal line; a grand total decimal carriage for the total of sub totals, the sub total decimal carriage reciprocating once for each number of the sub total, the grand total decimal carriage remaining temporarily stationary, and both decimal carriages traveling together for the accumulation of the grand totals; a set of keys; and mechanism operated by said keys to transfer a total from the sub total decimal carriage into the grand total decimal carriage while said carriages are traveling together.

2. In a machine adapted for calculating and horizontal printing, the combination of: a sub total totalizer for the accumulation of numbers printed in a horizontal line; a grand total totalizer for the total of sub totals, the sub total totalizer reciprocating once for each item of the sub total, the grand total totalizer remaining temporarily stationary and both totalizers traveling together for the accumulation of the grand totals; a set of numeral keys and mechanism coöperating with the two totalizers for the transferring of a total from one totalizer to the other upon the operation of said numeral keys.

3. In a machine adapted for calculating and horizontal printing, the combination of: a sub total decimal carriage for the total of numbers printed in a horizontal line; a grand total decimal carriage for the total of the sub totals; a printing carriage for determining the printing location; mechanism mounted upon the printing carriage for reciprocating the sub total decimal carriage; other mechanism mounted on said printing carriage for reciprocating the grand total decimal carriage; a set of keys; and mechanism for transferring a total from said sub total decimal carriage into said grand total decimal carriage upon the operation of said keys.

4. In a machine adapted for calculating and horizontal printing, the combination of: a sub total totalizer for the total numbers printed in a horizontal line; a grand total totalizer for the total of the sub totals; a printing carriage for determining the printing location; mechanism mounted upon the printing carriage for reciprocating the sub total totalizer; other mechanism mounted on said printing carriage for reciprocating the grand total totalizer; a set of keys; and mechanism for transferring a number from said sub total totalizer into said grand total totalizer upon the operation of said keys.

5. In a machine adapted for calculating and horizontal printing, the combination of: a sub totalizer; a grand totalizer; a master wheel for the sub totalizer; another master wheel for the grand totalizer; a set of numeral keys; gear connections between said master wheels determining that said wheels shall revolve equal amounts in opposite directions upon the actuation of said keys; a printing carriage for determining the printing location; and engaging mechanism mounted upon the printing carriage, said engaging mechanism causing the sub totalizer to reciprocate past its master wheel for the accumulation of sub totals, the grand totalizer remaining stationary and said engaging mechanism causing both totalizers to travel past their respective master wheels for the accumulation of the grand totals.

6. In a machine adapted for calculating and horizontal printing; a sub-total decimal carriage; a grand total decimal carriage; a printing carriage to determine the printing location; and selective engaging printing mechanism mounted upon said printing carriage and adapted to coöperate with the said two decimal carriages, said selective engaging mechanism operating to cause the travel of only one of said decimal carriages at one point of the travel of the printing carriage and to cause the travel of both of said decimal carriages at another point of travel of the printing carriage; a set of keys; one master mechanism adapted to coöperate with one of said decimal carriages; a second master mechanism adapted to coöperate with the second of said decimal carriages, said master mechanisms being also adapted to operate on said decimal carriages in the reverse direction, and a set of keys operative simultaneously upon both master mechanisms whereby a number may be transferred from one decimal carriage to the other upon the operation of said keys.

7. In a machine adapted for calculation and horizontal printing; the combination of a sub total decimal carriage; a grand total decimal carriage; a printing carriage for determining the printing location; an engager upon the printing carriage to move the sub total decimal carriage, but not operative upon the grand total decimal carriage; another engager adapted to move the grand total decimal carriage, but not the sub total decimal carriage; a set of keys; two master wheels coöperating with said decimal carriages during the time when said decimal carriages are being moved in unison by said printing carriage, said master wheels being arranged to move equal amounts in opposite directions upon the operation of said keys, whereby a number may be transferred from the sub total decimal carriage into the grand total decimal carriage upon a single operation of the said keys.

8. In a machine adapted for calculation and horizontal printing: the combination of a sub total decimal carriage; a grand total decimal carriage; a printing carriage for determining the printing location; an engager upon the printing carriage to move the sub total decimal carriage but not operative upon the grand total decimal carriage; another engager adapted to move both decimal carriages; a set of keys; and two master wheels coöperating with said decimal carriages while said carriages are being simultaneously moved with said printing carriage, said master wheels being adapted to move equal amounts in contrary directions upon the operation of said keys; whereby a number may be transferred from the sub total decimal carriage into the grand total decimal carriage upon a single operation of said keys.

9. In a machine adapted for calculation and horizontal printing: the combination of a sub total decimal carriage; a grand total decimal carriage; a printing carriage for determining the printing location; a projection upon the sub total decimal carriage; a projection upon the grand total decimal carriage, the projections upon the two decimal carriages being offset from each other; an engager for the sub total decimal carriage; another engager for the grand total decimal carriage, said two engagers being correspondingly offset and mounted upon the printing carriage whereby each engager coöperates with its own decimal carriage without affecting the other; a set of numeral keys; two master wheels connected to said keys and adapted to be rotated an equal amount in opposite directions upon the operation of any of said keys, said master wheels being spaced a distance apart equal to the space between said decimal carriages when said decimal carriages were being simultaneously moved by the printing carriage whereby a number may be transferred from one decimal carriage to the other upon a single operation of said keys.

10. In a machine adapted for calculating and horizontal printing: a sub-total decimal carriage; a grand-total decimal carriage; a printing carriage for determining the printing location; a long projection upon one decimal carriage; a short projection upon the other decimal carriage; a short engager for the long projection and a long engager for the short projection, the two engagers being mounted upon the printing carriage whereby each engager coöperates with its own decimal carriage without affecting the other.

11. In a machine adapted for calculating and horizontal printing: a sub-total decimal carriage; a grand-total decimal carriage; a printing carriage for determining the printing location; and engager pawls mounted upon said printing carriage and adapted to coöperate with the two decimal carriages, said engager pawls operating to cause the travel of only one of the decimal carriages at one point of the travel of the printing carriage, and to cause the travel of both decimal carriages at another point of the travel of the printing carriage; and means for retracting the engager pawls from the decimal carriages.

12. In a machine adapted for calculating and horizontal printing: a sub-total decimal carriage; a grand total decimal carriage; a printing carriage for determining the printing point; an engager pawl upon the printing carriage to coöperate with the sub-total decimal carriage but not operative upon the grand-total decimal carriage; another engager pawl adapted to coöperate with the grand total decimal carriage but not with the sub-total decimal carriage; and means for retracting the engager pawls from their decimal carriages.

13. In a machine adapted for calculating and horizontal printing: a sub-total decimal carriage; a grand-total-decimal carriage; a printing carriage to determine the printing location; an engager pawl upon the printing carriage to coöperate with the sub-total decimal carriage but not operative upon the grand-total decimal carriage; another engager pawl adapted to coöperate with both decimal carriages; and means for retracting the pawls from their decimal carriages.

14. In a machine adapted for calculating and horizontal printing: a sub-total decimal carriage; a grand-total decimal carriage; a printing carriage for determining the printing location; a projection upon the sub-total decimal carriage; a projection upon the grand-total decimal carriage; the projections on the two decimal carriages being off-set from each other; an engager pawl for the sub-total decimal carriage; another engager pawl for the grand-total decimal carriage; said two engager pawls being correspondingly off-set and mounted upon the printing carriage whereby each engager pawl coöperates with its own decimal carriage without affecting the other, and means for retracting the pawls from their decimal carriages.

15. In a machine adapted for calculating and horizontal printing: a subtotal-decimal carriage; a grand-total decimal carriage; a printing carriage for determining the printing location; a long projection upon one decimal carriage; a short projection on the other decimal carriage; a short engager pawl for the long projection; a long engager pawl for the short projection, the two engager pawls being mounted upon the printing carriage whereby each engager pawl coöperates with its own decimal carriage without affecting the other; and means for retracting the engager pawls from their decimal carriages.

16. In a machine adapted for calculating and horizontal printing: a sub-total decimal carriage; a grand-total decimal carriage; a printing carriage for determining the printing location; engager pawls mounted upon said printing carriage and adapted to coöperate with the two decimal carriages, said engager pawls operating to cause the travel of only one of the decimal carriages at one point of the travel of the printing carriage, and to cause the travel of both decimal carriages at another point of the travel of the printing carriage; and pawl mechanism for retracting the engager pawls from their decimal carriages.

17. In a machine adapted for calculating and horizontal printing: a sub-total decimal carriage; a grand-total decimal carriage; a printing carriage for determining the printing location; an engager pawl upon the printing carriage to coöperate with the subtotal decimal carriage but not operative upon the grand-total decimal carriage; another engager pawl adapted to coöperate with the grand-total decimal carriage but not with the subtotal decimal carriage; and pawl mechanism for retracting the engager pawls from their decimal carriages.

18. In a machine adapted for calculating and horizontal printing: a sub-total decimal carriage; a grand-total decimal carriage; a printing carriage to determine the printing location; an engager pawl upon the printing carriage to coöperate with the sub-total decimal carriage but not with the grand-total decimal carriage; another engager pawl adapted to coöperate with both decimal carriages; and pawl mechanism for retracting each engager pawl from its decimal carriage.

19. In a machine adapted for calculating and horizontal printing: a sub-total decimal carriage; a grand-total decimal carriage; a printing carriage for determining the printing location; a projection upon the sub-total decimal carriage; a projection upon the grand-total decimal carriage; the projections on the two decimal carriages being offset from each other; an engager pawl for the sub-total decimal carriage; another engager pawl for the grand-total decimal carriage; said two engager pawls being correspondingly off-set and mounted upon the printing carriage, whereby each engager pawl coöperates with its own decimal carriage without affecting the other; and pawl mechanism for retracting the engager pawls from their decimal carriages.

20. In a machine adapted for calculating and horizontal printing: a sub-total decimal carriage; a grand-total decimal carriage; a printing carriage for determining the printing location; a long projection on one decimal carriage; a short projection upon the other decimal carriage; a short engager pawl for the long projection; and a long engager pawl for the short projection; the two engager pawls being mounted upon the printing carriage, whereby each engager pawl coöperates with its own decimal carriage without affecting the other; and pawl mechanism for retracting the engager pawls from their decimal carriages.

21. In a machine adapted for calculating and horizontal printing the combination of: a jumping totalizer; a second jumping totalizer; a printing carriage to determine the printing location; a bar traveling with said carriage; adjustable selective engagers on said bar, said engagers being adapted to contact with and move said totalizers whereby it may be determined that during a portion of the travel of said printing carriage one of the totalizers will be reciprocated, and during another portion of said travel both totalizers may be reciprocated.

22. In a machine adapted for calculating and horizontal printing the combination of: a sub total jumping totalizer; a grand total jumping totalizer; a printing carriage to determine the printing location; a bar moving with said printing carriage; an engager mounted on said bar to contact with and move said sub total totalizer, but not operative upon said grand total totalizer; and another engager upon said bar adapted to contact with and move said grand total totalizer but not said sub total totalizer.

23. In a machine adapted for calculating and horizontal printing the combination of: a sub total totalizer; a grand total totalizer; a printing carriage for determining the printing location; a bar moving with said carriage; an engager upon said bar adapted to contact with and move said sub total totalizer, but not operative upon said grand total totalizer; and another engager adapted to coöperate with both totalizers.

24. In a machine adapted for calculating and horizontal printing the combination of: a sub total totalizer; a grand total totalizer; a printing carriage to determine the printing location; a bar traveling with said carriage; a projection upon the grand total totalizer; a projection upon the sub total totalizer, the projections on the two totalizers being offset from each other; an engager for the sub total totalizer mounted on said bar; and another engager for the grand total totalizer mounted on said bar, said two engagers being correspondingly offset whereby each engager coöperates with and moves its own totalizer without affecting the other.

25. In a machine adapted for calculating and horizontal printing; a sub-total totalizer; a grand-total totalizer; a printing carriage to determine the printing location; a long projection upon one totalizer; a short projection upon the other totalizer; a short engager for the long projection; a long engager for the short projection; the two engagers being mounted upon the printing carriage whereby each engager coöperates with its own totalizer without affecting the other.

26. In a machine adapted for calculating and horizontal printing: a sub-total totalizer; a grand-total totalizer; a printing carriage to determine the printing location; and engager pawls mounted upon said printing carriage and adapted to coöperate with the two totalizers, said engager pawls operating to cause the travel of only one of the totalizers at one point in the travel of the printing carriage, and to cause the travel of both totalizers at another point of the travel of the printing carriage; and means for retracting the pawls from the totalizers.

27. In a machine adapted for calculating and horizontal printing: a sub-total totalizer; a grand-total totalizer; a printing carriage for determining the printing location; an engager pawl upon the printing carriage to coöperate with the sub-total totalizer but not operative upon the grand-total totalizer; another engager pawl adapted to coöperate with the grand-total totalizer but not with the sub-total totalizer; and means for retracting the engager pawls from their totalizers.

28. In a machine adapted for calculating and horizontal printing: a sub-total totalizer; a grand-total totalizer; a printing carriage to determine the printing location; an engager pawl upon the printing carriage to coöperate with the sub-total totalizer but not operative upon the grand-total totalizer; another engager pawl adapted to coöperate with both totalizers; and means for retracting each pawl from its totalizer.

29. In a machine adapted for calculating and horizontal printing: a sub-total totalizer; a grand-total totalizer; a printing carriage to determine the printing location; a projection upon the sub-total totalizer; a projection upon the grand-total totalizer; the projections on the two totalizers being off-set from each other; an engager pawl for the sub-total totalizer; another engager pawl for the grand totalizer; said two engager pawls being correspondingly off-set and mounted upon the printing carriage whereby each engager pawl coöperates with its own totalizer without affecting the other; and means for retracting each pawl from its totalizer.

30. In a machine adapted for calculating and horizontal printing: a sub-total totalizer; a grand-total totalizer; a printing carriage to determine the printing location; a long projection upon one totalizer; a short projection upon the other totalizer; a short engager pawl for the long projection; a long engager pawl for the short projection; the two engager pawls being mounted upon the printing carriage whereby each engager pawl coöperates with its own totalizer without affecting the other; and means for retracting each engager pawl from its totalizer.

31. In a machine adapted for calculating and horizontal printing: a sub-total totalizer; a grand-total totalizer; a printing carriage to determine the printing location; engager pawls mounted upon said printing carriage and adapted to coöperate with the two totalizers, said engager pawls operating to cause the travel of only one of the totalizers at one point in the travel of the printing carriage, and to cause the travel of both totalizers at another point in the travel of the printing carriage; and pawl mechanism for retracting the engager pawls from the totalizers.

32. In a machine adapted for calculating and horizontal printing: a sub-total totalizer; a grand-total totalizer; a printing carriage to determine the printing location; an engager pawl upon the printing carriage to coöperate with the sub-total totalizer, but not operative upon the grand-total totalizer; another engager pawl adapted to coöperate with the grand-total totalizer, but not with the sub-total totalizer; and pawl mechanism for retracting the engager pawls from the totalizers.

33. In a machine adapted for calculating and horizontal printing: a sub-total totalizer; a grand-total totalizer; a printing carriage to determine the printing location; an engager pawl upon the printing carriage to coöperate with the sub-total totalizer but not with the grand-total totalizer; another engager pawl adapted to coöperate with both totalizers; and pawl mechanism for retracting the engager pawls from the totalizers.

34. In a machine adapted for calculating and horizontal printing: a sub-total totalizer; a grand-total totalizer; a printing carriage to determine the printing location; a projection upon the sub-total totalizer; a projection upon the grand-total totalizer; the projections upon the two totalizers being off-set from each other; an engager pawl for the sub-total totalizer; another engager pawl for the grand-total totalizer; said two engager pawls being correspondingly off-set and mounted upon the printing carriage whereby each engager pawl coöperates with its own totalizer without affecting the other; and pawl mechanism for retracting the engager pawls from the totalizers.

35. In a machine adapted for calculating and horizontal printing: a sub-total totalizer; a grand-total totalizer; a printing carriage to determine the printing location; a long projection upon one totalizer; a short projection upon the other totalizer; a short engager pawl for the long projection; a long engager pawl for the short projection; the two engager pawls being mounted upon the printing carriage whereby each engager pawl coöperates with its own totalizer without affecting the other; and pawl mechanism for retracting the engager pawls from the totalizers.

36. In a machine adapted for calculating and horizontal printing: a sub-total totalizer, said totalizer being reversible, for the total of numbers printed in a horizontal line; a grand-total totalizer for the total of the sub-totals; a printing carriage for determining the printing location; a sub-total engaging mechanism mounted upon the printing carriage for reciprocating the sub-total totalizer for the sub-totals; and a grand-total engaging mechanism for causing both totalizers to travel for the accumulation of the grand total.

37. In a machine adapted for calculating and horizontal printing: a sub-totalizer, said totalizer being reversible; a grand totalizer; a master wheel for the sub-totalizer; another master wheel for the grand totalizer; a printing carriage for determining the printing location; engaging mechanism mounted upon the printing carriage, said engaging mechanism causing the sub-totalizer to reciprocate past its master wheel for the accumulation of the sub-totals, the grand-totalizer remaining temporarily stationary; and said engaging mechanism causing both totalizers to travel past their respective master wheels for the accumulation of the grand totals.

38. In a machine adapted for calculating and horizontal printing: a sub-total totalizer, said totalizer being reversible; a grand-total totalizer; a printing carriage to determine the printing location; and selective engaging mechanism mounted upon said printing carriage and adapted to coöperate with the two totalizers, said selective engaging mechanism operating to cause the travel of only one of said totalizers at one point of the travel of the printing carriage, and to cause the travel of both of said totalizers at another point of the travel of the printing carriage.

39. In a machine adapted for calculating and horizontal printing: a sub-total totalizer, said totalizer being reversible, a grand-total totalizer; a printing carriage to determine the printing location; an engager upon the printing carriage to coöperate with the sub-total totalizer but not operative upon the grand-total totalizer; and another engager adapted to coöperate with the grand-total totalizer but not with the sub-total totalizer.

40. In a machine adaped for calculating and horizontal printing: a sub-total totalizer, said totalizer being reversible; a grand-total totalizer; a printing carriage for determining the printing location; an engager upon the printing carriage to coöperate with the sub-total totalizer but not operative upon the grand-total totalizer; and another engager adapted to coöperate with both totalizers.

41. In a machine adapted for calculating and horizontal printing: a sub-total totalizer, said totalizer being reversible; a grand-total totalizer; a printing carriage to determine the printing location; a projection upon the grand-total totalizer; a projection upon the sub-total totalizer; the projections on the two totalizers being offset from each other; an engager for the sub-total totalizer; another engager for the grand-total totalizer; said two engagers being correspondingly off-set and mounted upon the printing carriage whereby each engager coöperates with its own totalizer without affecting the other.

42. In a machine adapted for calculating and horizontal printing: a sub-total totalizer, said totalizer being reversible; a grand-total totalizer; a printing carriage to determine the printing location; a long projection upon one totalizer; a short projection upon the other totalizer; a short engager for the long projection; a long engager for the short projection; the two engagers being mounted upon the printing carriage whereby each engager coöperates with its own totalizer without affecting the other.

43. In a machine adapted for calculating and horizontal printing: a sub-total totalizer, said totalizer being reversible; a grand-total totalizer; a printing carriage to determine the printing location; and engager pawls mounted upon said printing carriage and adapted to coöperate with the two totalizers, said engager pawls operating to cause the travel of only one of the totalizers at one point in the travel of the printing carriage, and to cause the travel of both totalizers at another point of the travel of the printing carriage; and means for retracting the pawls from the totalizers.

In testimony whereof, I have hereunto subscribed my name in the presence of two witnesses.

JOHN C. WAHL.

Witnesses:
DAVID GOLDBERG,
E. W. STOLZENBACH.

Copies of this patent may be obtained for five cents each, by addressing the "Commissioner of Patents, Washington, D. C."